US012526008B2

(12) United States Patent
Vijayasankar et al.

(10) Patent No.: US 12,526,008 B2
(45) Date of Patent: *Jan. 13, 2026

(54) SLEEPY DEVICE OPERATION IN ASYNCHRONOUS CHANNEL HOPPING NETWORKS

(71) Applicant: TEXAS INSTRUMENTS INCORPORATED, Dallas, TX (US)

(72) Inventors: Kumaran Vijayasankar, Allen, TX (US); Robert Liang, Frisco, TX (US); Jyothsna Kunduru, Plano, TX (US); Kwang Seop Eom, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,678

(22) Filed: Apr. 26, 2024

(65) Prior Publication Data
US 2024/0275428 A1 Aug. 15, 2024

Related U.S. Application Data

(63) Continuation of application No. 18/185,609, filed on Mar. 17, 2023, now Pat. No. 12,003,271, which is a
(Continued)

(51) Int. Cl.
*H04W 52/00* (2009.01)
*H04B 1/7156* (2011.01)
(Continued)

(52) U.S. Cl.
CPC ............ *H04B 1/7156* (2013.01); *H04W 4/80* (2018.02); *H04W 52/0235* (2013.01);
(Continued)

(58) Field of Classification Search
None
See application file for complete search history.

(56) References Cited

U.S. PATENT DOCUMENTS 6,088,591 A * 7/2000 Trompower .......... H04J 3/0664
455/438
6,259,898 B1 7/2001 Lewis
(Continued)

FOREIGN PATENT DOCUMENTS

CN 1363157 A 8/2002
CN 101455114 B 10/2011
(Continued)

OTHER PUBLICATIONS

English translation for; First Office Action for Corresponding CN Application; PRC (China) Pat. Application No. 202110450771.0; issued Dec. 29, 2021.
(Continued)

*Primary Examiner* — Abdelillah Elmejjarmi
(74) *Attorney, Agent, or Firm* — Michelle F. Murray; Frank D. Cimino

(57) ABSTRACT

A radio communications device includes a RTC configured to run even during sleep for receiving from a coordinator node (CN) in an asynchronous channel hopping WPAN an asynchronous hopping sequence (AHS) frame that includes the CN's hopping sequence. A processor implements a stored sleepy device operation in asynchronous channel hopping networks algorithm. The algorithm is for determining a time stamp for the AHS frame and the CN's initial timing position within the hopping sequence, storing the time stamp, going to sleep and upon waking up changing a frequency band of its receive (Rx) channel to an updated fixed channel. A data request command frame is transmitted by the device on the CN's listening channel that is calculated from the CN's hopping sequence, time stamp, CN's initial
(Continued)

timing position and current time, and the device receives an ACK frame transmitted by the CN at the updated fixed channel of Rx operation.

20 Claims, 4 Drawing Sheets

Related U.S. Application Data continuation of application No. 17/356,792, filed on Jun. 24, 2021, now Pat. No. 11,637,585, which is a continuation of application No. 16/576,345, filed on Sep. 19, 2019, now Pat. No. 11,082,086, which is a continuation of application No. 15/332,707, filed on Oct. 24, 2016, now Pat. No. 10,491,265.

(60) Provisional application No. 62/327,794, filed on Apr. 26, 2016.

(51) Int. Cl.
*H04W 4/80* (2018.01)
*H04W 52/02* (2009.01)

(52) U.S. Cl.
CPC ............. *H04W 52/0274* (2013.01); *H04B 2001/71563* (2013.01); *H04B 2201/71338* (2013.01); *Y02D 30/70* (2020.08)

(56) References Cited

U.S. PATENT DOCUMENTS

| | | | |
|---|---|---|---|
| 8,588,119 | B2 | 11/2013 | Panta |
| 2004/0013167 | A1 | 1/2004 | Jones |
| 2006/0285579 | A1 | 12/2006 | Rhee |
| 2008/0080431 | A1 | 4/2008 | Zeira |
| 2009/0089577 | A1* | 4/2009 | Shon ................ H04L 63/1466 713/160 |
| 2014/0343891 | A1 | 11/2014 | Becker |
| 2015/0382296 | A1* | 12/2015 | Wentzloff ............ H03K 3/0231 375/130 |
| 2016/0037449 | A1 | 2/2016 | Kandhalu Raghu |
| 2016/0095147 | A1 | 3/2016 | Kim |

FOREIGN PATENT DOCUMENTS

| | | |
|---|---|---|
| CN | 101521527 B | 12/2012 |
| CN | 101461151 B | 1/2013 |
| CN | 102946631 B | 5/2016 |
| CN | 105245248 B | 10/2017 |
| CN | 103857058 B | 3/2019 |
| CN | 105323835 B | 6/2020 |
| JP | H07245598 A | 9/1995 |

OTHER PUBLICATIONS

First Office Action for Corresponding CN Application; PRC (China) Pat. Application No. 202110450771.0; issued Dec. 29, 2021.
Jianqiang Zeng, etc., Time hopping direct-sequence CDMA for asynchronous transmitter-only sensors:, MILCOM 2008-2008 IEEE Military Communications Conference; Nov. 16, 2008.
Jonas Olsson, "6LoWPAN Demystified", Texas Instruments, 2014, Chapters <<Introduction>>, <<6LoWPAN network architecture>>, <<Header formats>>, <<Interoperability>>, fig. 1, [online] [retrieved on Apr. 7, 2017] Retrieved from Internet: <URL: http://www.ti.com/lit/wp/swry013/swry013.pdf>.
Translation of Notification of First CN Office Action and Search Report by China National Intellectual Property Administration; issue date: Apr. 2, 2020; 4 pages.
Yingjun Yuan, "Research on Non-cooperative Frequency Hopping Signal Processing Technology", Full-text Database of China's Outstanding Master's Thesis; Feb. 15, 2012.

* cited by examiner

SLEEPY DEVICE OPERATION IN ASYNCHRONOUS CHANNEL HOPPING NETWORKS

CROSS REFERENCE TO RELATED APPLICATIONS

This application is a continuation of U.S. patent application Ser. No. 18/185,609 filed Mar. 17, 2023, which is a continuation of U.S. patent application Ser. No. 17/356,792 filed Jun. 24, 2021, now U.S. Pat. No. 11,637,585, which is a continuation of U.S. patent application Ser. No. 16/576,345 filed Sep. 19, 2019, now U.S. Pat. No. 11,082,086, which is a continuation of U.S. application Ser. No. 15/332,707 filed Oct. 24, 2016, now U.S. Pat. No. 10,491,265, which claims the benefit of U.S. Provisional Application No. 62/327,794, filed Apr. 26, 2016, which applications are hereby incorporated herein by reference.

FIELD

Disclosed embodiments relate generally to wireless personal area networks, and more particularly to asynchronous (un-slotted) channel hopping in such networks.

BACKGROUND

IEEE 802.15.4e is an enhanced media access control (MAC) layer protocol of IEEE 802.15.4 designed for low power and low data rate networks. The IEEE 802.15.4e architecture is defined in terms of a number of blocks in order to simplify the standard. These blocks are called layers. Each layer is responsible for one part of the standard and offers services to the higher layers. The interfaces between the layers serve to define the logical links that are described in the standard. A low-rate (LR)-Wireless personal area network (WPAN) device comprises at least one PHY (physical layer), which contains the radio frequency (RF) transceiver along with its low-level control mechanism, and a medium access control (MAC) sublayer that provides access to the physical channel for all types of transfers.

IEEE 802.15.4e is suitable for sensor devices with resource constraints; e.g., low power consumption, low computation capabilities, and low memory. As sensors and actuators that are interconnect by a personal area network (PAN) in home and office environments become more common, limiting power dissipation of each device is important. Some devices may operate on a battery, in which case frequent battery changes are undesirable. Some devices may operate on a limited amount of power that is generated by the device itself such as using conversion from solar or other light sources, scavenging from motion or thermal effects, or collection of energy from ambient electromagnetic fields.

Channel hopping is known for improving network capacity. Channel hopping can be achieved by a variety of different methods. The two most common known hopping methods are a synchronous method called Time Slotted Channel Hopping (TSCH) and an asynchronous channel hopping method defined in IEEE 802.15.4e. Many standards also exist that use such a channel hopping MAC to define MAC protocols for different applications. For example the Wi-SUN™ Alliance has published a Field Area Network (FAN) specification that specifies how to use asynchronous channel hopping for smart grid applications.

In TSCH, the time is divided into time slots, and every network device is time-synchronized to a root node in the network and uses the time slots to communicate/synchronize in the network. The device hops among all channels according to a frequency hopping sequence (FHS) during the time slots. TSCH can achieve higher capacity and provide finer granularity for power savings in IEEE 802.15.4e networks.

In asynchronous channel hopping networks, nodes hop to different channels (frequency bands) in a globally unsynchronized manner. The nodes in such networks must therefore always stay awake to enable channel hopping for achieving increased network throughput by promoting simultaneous data transfer over multiple channels between different pairs of nodes, or to achieve reliability in tough channel conditions by exploiting the channel diversity.

WPANs are used to convey information over relatively short distances. Unlike wireless local area networks (WLANs), connections effected via WPANs involve little or no infrastructure. This feature allows small, power-efficient, inexpensive network solutions to be implemented for a wide range of devices. Two different device types can participate in an IEEE 802.15.4 network include a full-function device (FFD) and a reduced-function device (RFD). An FFD is a device that is capable of serving as a personal area network (PAN) coordinator. An RFD is a device that is not capable of serving as a PAN coordinator. An RFD is intended for applications that are simple, such as a light switch or a passive infrared sensor that does not have the need to send large amounts of data and to only associate with a single FFD at a time. Consequently, the RFD can be implemented using minimal resources and memory capacity.

Although IEEE 802.15.4 supports asynchronous channel hopping networks, it does not disclose or suggest a solution for sleepy node device operation in such networks. Because sleepy nodes are required to go into a low power state where they are not be able to maintain their hopping sequence, this requires the sleepy node devices in the IEEE 802.15.4 network to therefore always stay awake to support channel hopping operation.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments are directed, in general, to communications and, more specifically, to methods of sleepy node radio communication device (SN) operation in asynchronous (or unslotted) channel hopping networks. Disclosed embodiments utilize a combination of pseudo-channel hopping at the SN regular asynchronous channel hopping at the non-sleepy coordinator node radio device (CN) for star (or tree)-based networks, where the SNs talk to the non-sleepy CN (parent) and do not support any children nodes of their own.

In disclosed embodiments the SN obtains the hopping information it needs to track the CN's channel as specified in a wireless communications standard such as the Wi-SUN™ standard. Using only the time difference between the last received frame from CN ($t_1$ shown in FIG. 2B described below) and time of transmission of the frame ($\Delta t$ shown in FIG. 2B described below) from the SN (irrespective of the length of time of a potential sleep for the SN in between), the SN keeps track of its CN's hopping. The SN can always change its Rx channel and will convey its current Rx channel information to the CN by adding it to a data request command frame.

The SN can include a hardware real time clock (RTC) that remains ON even during sleep, and the SN is allowed to go to sleep, for generally a sleep time that spans more than one sequential frame. The SN later wakes up from sleep and changes a frequency band of its receive (Rx) channel to an updated fixed Rx channel of operation, and then can exchange its updated Rx channel in a poll request (a data request frame) to its CN. The SN receiving a hopping sequence frame from the CN along with timing information from its RTC (or another clock) and the hopping sequence frame allows the SN to keep track of CN's hopping schedule even across sleep periods. This enhances IEEE 802.15.4 sleep mode operation to now allow SNs the feature of sleep mode operation in an asynchronous channel hopping network (ACHN).

BRIEF DESCRIPTION OF THE DRAWINGS

Reference will now be made to the accompanying drawings, which are not necessarily drawn to scale, wherein.

DETAILED DESCRIPTION

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents.

Figure 1:
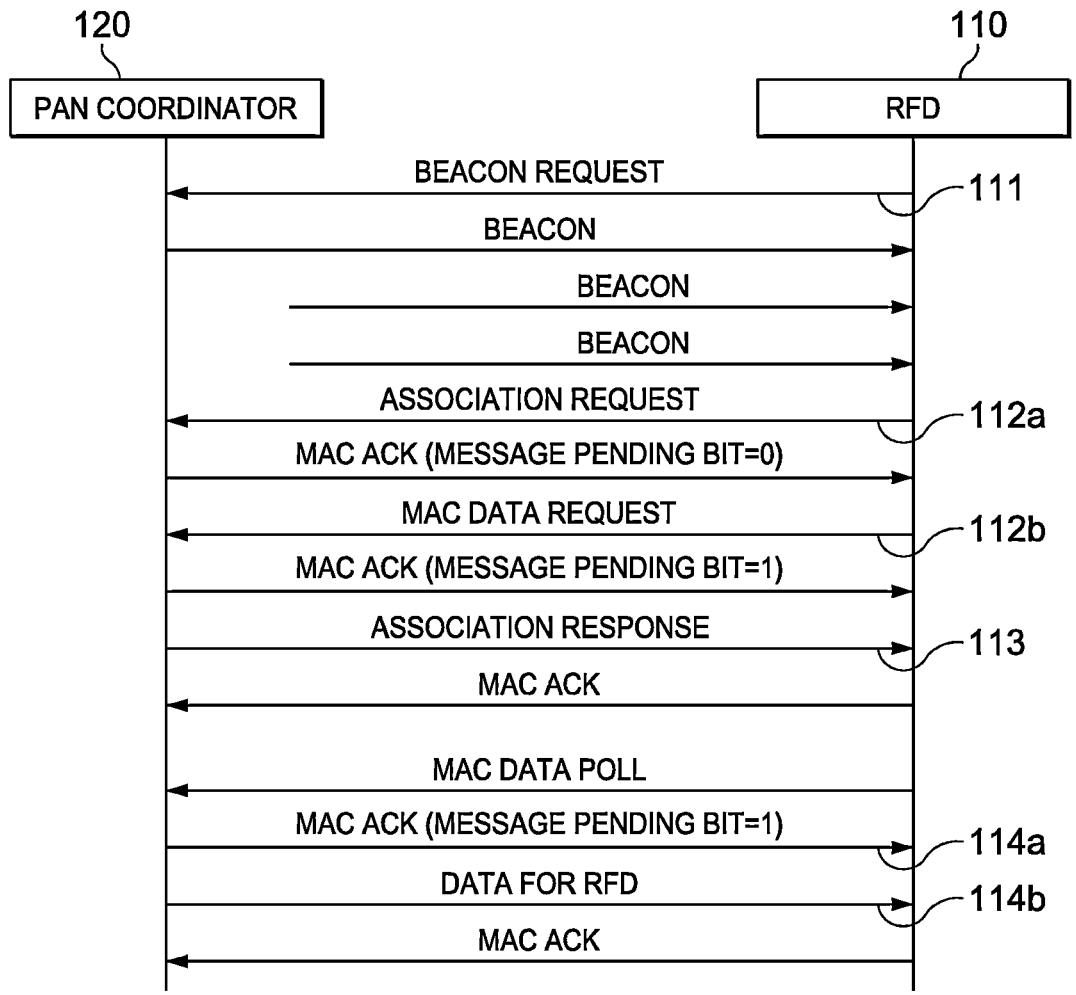
FIG. 1 shows operational steps in a known IEEE 802.15.4 indirect transmission procedure where the SN is shown as an RFD and the CN as a PAN coordinator.

In known art, IEEE 802.15.4 provides a method called indirect transmission that is used in a message exchange between a SN and non-sleepy CN (or parent node). FIG. 1 shows operational steps in this known IEEE 802.15.4 indirect transmission procedure (marked prior art) where the SN is shown as an RFD 110 and the CN as a PAN coordinator 120.

SNs are a special type of RFD 110 which can turn their receiver off during idle times to conserve electrical power. SNs go into a low power state during sleep where they are not be able to transmit or receive any frames. In order for SNs such as RFD 110 to participate in a network operation, the SN conventionally performs the following steps that are shown in FIG. 1.

Step 1. First scanning for an available network using a beacon-based active or a passive scan procedure shown as a beacon request 111.

Step 2. After receiving at least one beacon from the PAN coordinator 120, the RFD 110 performs an association procedure by sending the association request 112a shown during which it indicates its capability as a SN to the PAN coordinator 120 and then the RFD 110 sends a data request command frame shown as a MAC data request 112b to the PAN coordinator 120.

Step 3. The PAN coordinator 120 responds using an association response message 113 stating whether it accepts to operate with such a SN.

Step 4. Upon a successful association concluded with the association response message 113 where the PAN coordinator 120 accepts communications with the RFD 110, and the RFD 110 sends an acknowledgement (ACK), and the data exchange between the PAN coordinator 120 and the RFD 110 occurs as follows:

The RFD 110 can transmit data to the PAN coordinator 120 at any time because the PAN coordinator 120's receiver is always ON. The RFD 110 sends a MAC data poll to the PAN coordinator 120. After sending a MAC ACK 114a to the RFD 110, the PAN coordinator 120 transmits a data frame 114b using indirect transmission to the RFD 110 where the MAC ACK 114a buffers the data frame 114b for the RFD 110. The RFD 110 polls for data from the PAN coordinator 120 whenever it wakes up from sleep mode using the MAC data request 112b. The PAN coordinator 120's MAC then transmits the data frame 114b to RFD 110.

However, it is recognized this known method for SNs to participate in PAN operation cannot be directly applied to the FAN specification. This is because SNs such as RFD 110 cannot asynchronous channel hop due to the following three (3) reasons that make implementation of asynchronous channel hopping not possible:

1. The Wi-SUN™ FAN specification does not natively support the IEEE command frames for association and indirect transmission.
2. A SN such as RFD 110 does not keep track of the PAN coordinator 120's current receiver channel after a sleep operation. In this ACH mode, the PAN coordinator 120's hops on different receive channels. The onus is on the SN (such as RFD 110) transmitter to send the packet on the right receive channel so that the PAN coordinator 120 can receive it. Hence, the SN (such as RFD 110) being the transmitter of the data request command (MAC data request 112b) is unable to keep track of the hopping sequence of the PAN coordinator 120.
3. The SN such as RFD 110 does not keep track of its unicast hopping sequence during sleep.

According to Wi-SUN™ FAN every device node has to keep track and hop on its own sequence and the transmitter shall then use the same sequence to determine its receive channel when initiating the transmissions. A scheme to maintain the PAN coordinator 120's hopping sequence across sleep operation for a SN such as RFD 110 could thus require maintenance of dwell intervals during sleep states which could hamper the level to which a SN can go to sleep (and thus raise the power it consumes).

Disclosed embodiments use the below-described communication sequence to solve each of the above-described three reasons that make implementation not possible for SNs to operate in ACHNs. The ACHN as defined in Wi-SUN™ does not allow for exchange of IEEE command frames which would allow for command frames to be supported for association and indirect transmission. In order for the SN to keep track of a non-sleepy CN's hopping schedule, the SN can have a real-time clock (RTC) that stays on even during sleep, and the SN can store the time stamp of the last received frame from the CN in terms using its RTC (or another clock). When the SN intends to transmit a frame to CN, it computes the difference in time based on the RTC and then can use the Unicast Fractional Slot Interval (UFSI) being the field that contains the timing information of the node's current position in its hopping sequence, from the last received frame from the CN to compute the CN's current receive channel.

This implies that a SN should not go to low power mode for more than the RTC's wraparound time. Wrap around times are implemented as some number of bytes of data, such as 4 bytes, then it only stores a maximum value such as $2^{32}$, any time after that shall wraparound to 0 and continue. It is recommended that the SN does not go back to low power mode without receiving updated timing information from the CN or wake up multiple times within a wraparound period to perform the data request operation.

The requirement to maintain a SN's own hopping schedule across sleep operation would complicate the design of SNs they would now have to keep track of their sleep times accurately. To overcome this limitation and solve this problem, disclosed SNs use a fixed channel of Rx operation. However, to achieve a change in listening (Rx) frequency the SNs change the fixed channel of Rx operation each time they wake up. In order for the CN to know the updated fixed channel of Rx operation in which the SN operates, the SN advertises (carries) its fixed channel of Rx operation in its data request command by including a unicast schedule. The CN is then able to use this newly updated channel information to transmit the indirect frame over the correct channel to the SN.

Disclosed methods of SN operation in ACHNs thus utilize a combination of:
1. Pseduo-channel hopping at the SN where the Rx channel is changed before Tx of a data request command frame either by application, higher layer or MAC, using any hopping sequence. Such an hopping sequence need not be exchanged to the CN as any time the CN wants to send a frame to the SN it has happened after the receipt of a data request command which contains the current Rx channel of the SN.
2. The asynchronous receive channel hopping sequence of the CN device based on some standard hopping sequence is exchanged to the SN through information elements (IE) in an asynchronous frame (PAN Advertisement/PAN Configuration frames). The SN can use this exchanged hopping sequence and the time stamps to determine the channel at which the CN device is currently listening.

Figure 2A:
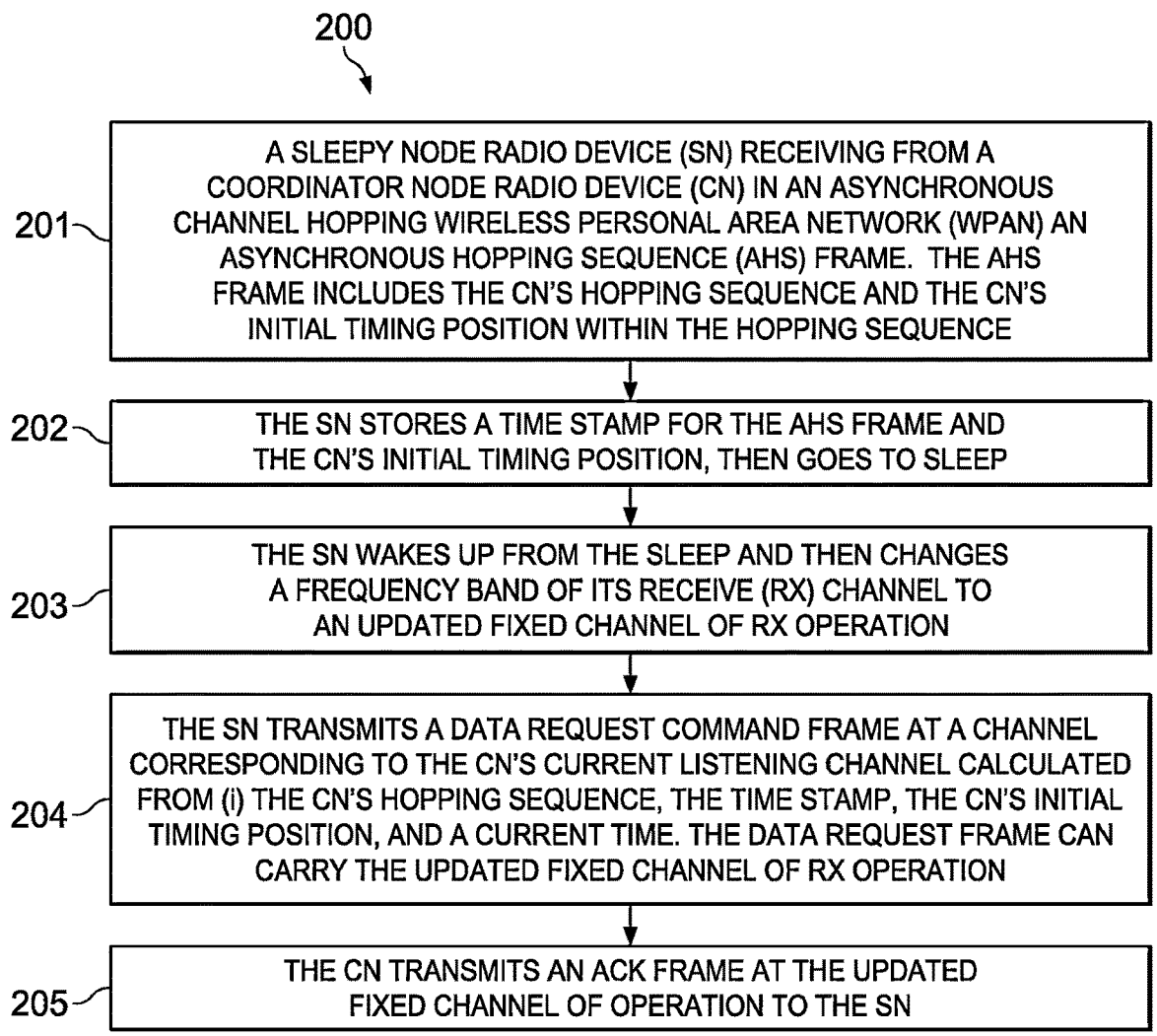
FIG. 2A is a flowchart and FIG. 2B an accompanying associated timeline for an example method of SN device operation in ACHN communications, according to an example embodiment.
Figure 2B:
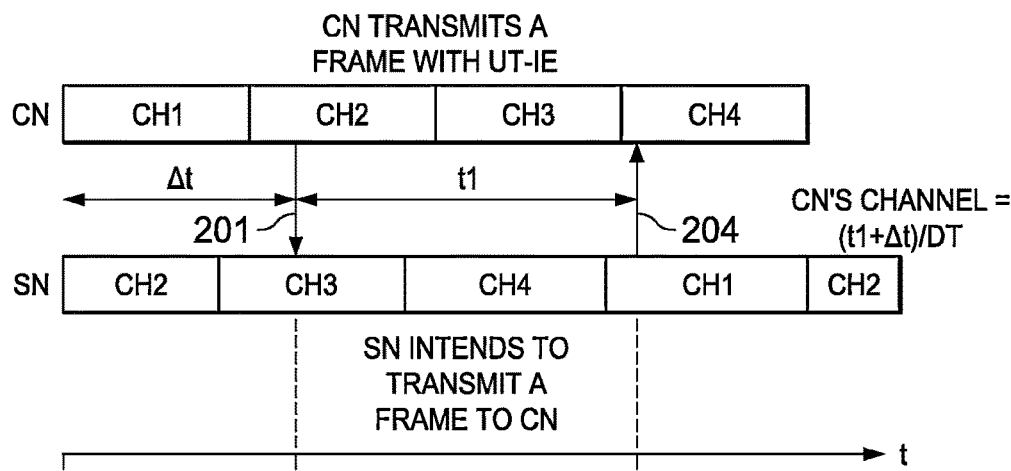

FIG. 2A is a flowchart and FIG. 2B an accompanying associated timeline for an example method 200 of SN operation in a WPAN having a CN, according to an example embodiment. As described below method 200 enables the SN to change a frequency of its Rx channel without actually performing any hopping.

Step 201 comprises the SN receiving from the CN an AHS frame that includes the CN's hopping sequence and the CN's initial timing position within the hopping sequence. The CN's timing position within the hopping sequence can be based on timing information included within the AHS frame or in another communication received from the CN (e.g., from last received data from the CN or an ACK frame from the CN). The SN can include a RTC configured to run even during sleep mode operation that generates a time stamp from the AHS frame reflecting a time which the AHS frame from the CN was received.

In the FIG. 2B timeline, at a time shown as 251, the CN transmits frame(s) along with additional information as information elements (IE)s. IE are a MAC frame 'unit' which can be used to carry additional information apart from payload data. A special IE which may be called a timing IE, is generally used by the CN in the AHS frame in step 201 to carry the timing information of its current position within its hopping sequence at that time. The time at 251 is shown as being Δt from some reference time that is shown in FIG. 2B as being time 0. At Δt the CN is shown being at CH 2.

Step 202 comprises the SN storing the time stamp and the CN's initial timing position (e.g., as reported inside the AHS frame), then going to sleep. The time stamp as noted above can be provided by a RTC generally at the SN.

Step 203 comprises the SN waking up from the sleep and then changing a frequency band of its Rx channel to an updated fixed channel of Rx operation. For example, in the United States, the 902-928 MHz band can be split into 129 200 KHz wide channels, any of which can be used by the SN for the Rx channel. In the FIG. 2B timeline, the CN sleeps for a period of time=$t_1$.

In step 204, the SN transmits a data request command frame at a channel corresponding to the CN's current listening channel calculated from (i) the CN's hopping sequence, (ii) the time stamp, (iii) the CN's initial timing position, and (iv) a current time (e.g., current time obtained from the SN's RTC, see RTC 304 in FIG. 3 described below). Optionally, the data request command frame can include additional payload information including the updated fixed channel of Rx operation to the CN for advertising the updated fixed channel of Rx operation to the CN. The CN's calculated current listening channel is shown in FIG. 2B as being CH 4. The data request command frame is transmitted as a unicast transmission. In the FIG. 2B timeline, at a time shown as 252, the SN transmits a frame to the CN at the CN's current listening channel (CH 4) shown calculated as (t1+Δt)/DT. DT stands for dwell time, being the amount of time a node stays on a given channel before moving to next channel.

Step 205 comprises the CN transmitting an ACK frame at the updated fixed channel of Rx operation to the SN. Following step 205, the CN can transmit data at the updated fixed channel of Rx operation to the SN (thus on the same channel as the ACK frame), followed by the SN transmitting data at the CN's current listening channel to the CN.

In an alternate embodiment, the updated fixed channel of Rx operation selected by the SN after it wakes up is set to the CN's listening (Rx) channel at the time of the SN transmitting the data request command (calculated by the SN to transmit the data request command frame in step 204). In yet another alternate embodiment, the CN implicitly 'understands' that the updated fixed channel of Rx operation of the SN is the same channel on which the CN received the data request command frame without the need of explicitly exchanging identification of the Rx channel of operation of the SN over the data request command frame. In this embodiment, the SN does not 'append' its listening (Rx) channel to the data request command frame. Instead the CN understands that the SN will be listening for a response from the CN in that same channel at which the CN had received the data request command frame.

Advantages of disclosed SN operation in ACHNs include:
1. being compatible with current operation of Wi-SUN™ un-slotted channel hopping mechanism;
2. not posing any strict timing requirement on either the SN or the CN;
3. the SN does not need to keep track of its hopping sequence, and
4. allows for the use of any implementation specific hopping sequence on SN.

Figure 3:
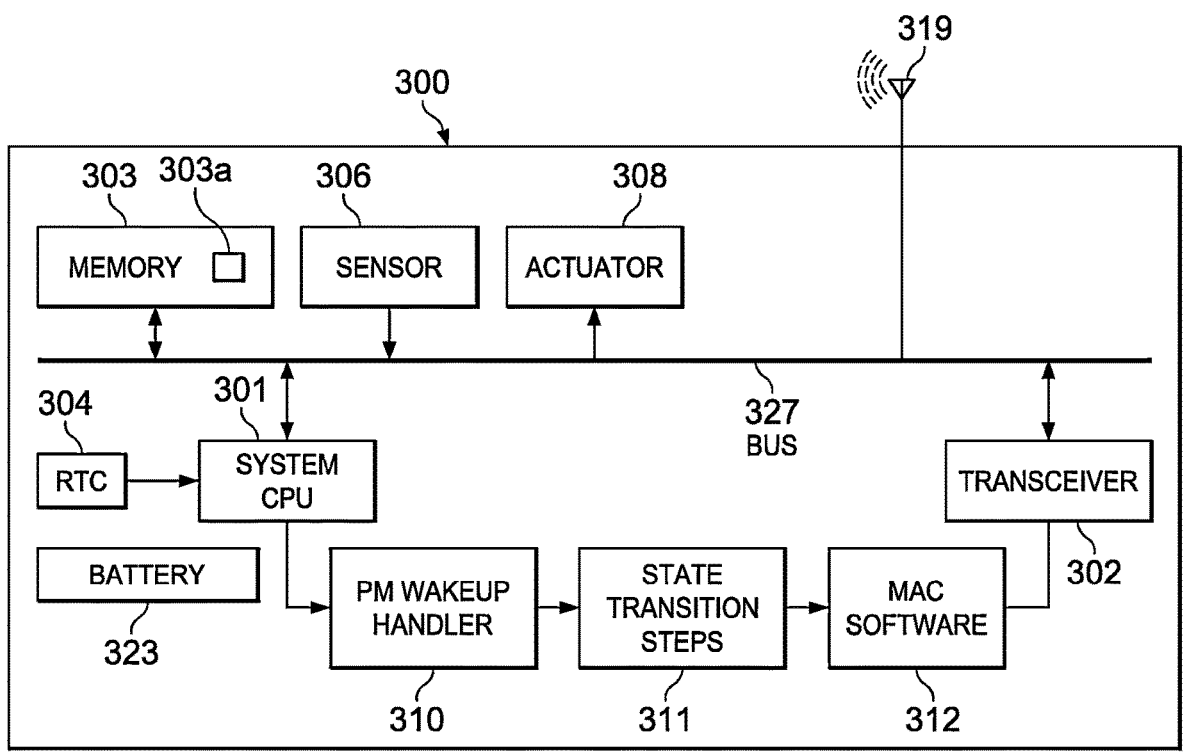
FIG. 3 is a block diagram schematic of an example asynchronous channel hopping (ACH) device having a disclosed communications device having a SN side ACHN operation algorithm, according to an example embodiment.

FIG. 3 is a block diagram schematic of an example SN 300 having a disclosed SN side ACHN operation algorithm 303a. The CN does not need any change(s) to implement disclosed SN device operation in asynchronous channel hopping networks, but should support the indirect transmissions such as defined in IEEE 802.15.4, and include a RTC. SN device 300 may include a system processor (system CPU) 301 that includes a nonvolatile memory 303 (e.g., static random-access memory (SRAM)) for holding instructions and data. Nonvolatile memory 303 may store software program instructions that may be executed by the system CPU 301 and/or the transceiver 302 to perform some or all of the network functions described herein, for example running the ACHN operation algorithm 303a. SN 300 is also shown implementing a wakeup handler block 310 which performs the necessary state transition steps 311 (e.g., radio setup) and MAC software block 312. Functions for 310-312 may be performed by software executed on the system CPU 301. SN 300 is shown powered by a battery 323. One or more sensors 306 and/or one or more actuator circuits 308 may be included in SN 300 for interacting with the physical world.

A bus 327 couples together the respective components of SN 300. Transceiver 302 is coupled to the antenna 319. A hardware RTC 304 is included in SN 300 that is provided to the system CPU 301.

Disclosed subject matter can be used in a variety of applications. One application has a plurality of disclosed SNs including a sensor 306 or an actuator 308. In this embodiment the WPAN is part of a smart grid that can comprise an electricity supply network which uses digital communications to detect and react to local changes in electrical usage. Other example uses include industrial automation and home automation.

Examples

Disclosed embodiments are further illustrated by the following specific Examples, which should not be construed as limiting the scope or content of this Disclosure in any way.

Figure 4:
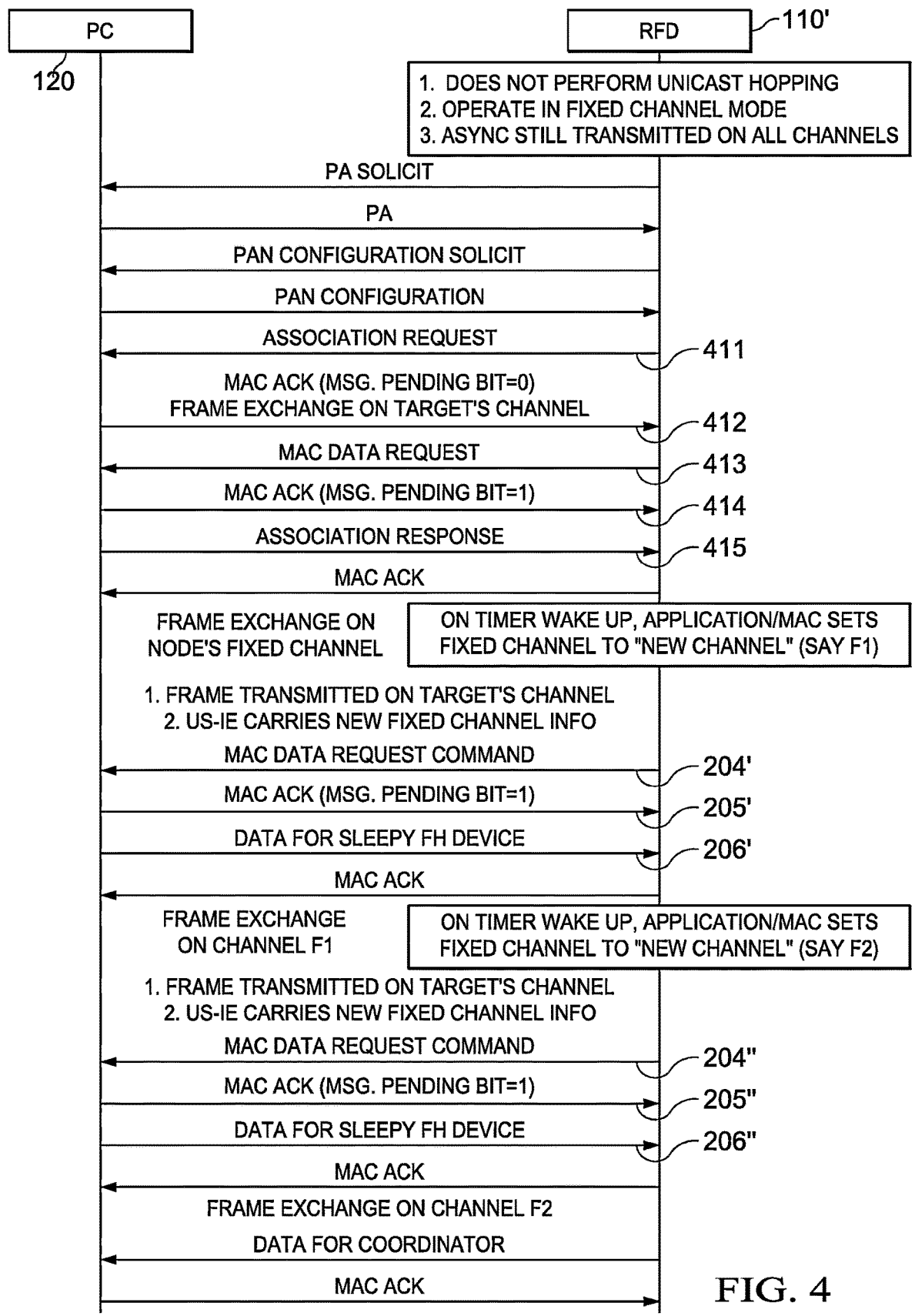
FIG. 4 shows operational steps in a detailed specific embodiment for SN operations in an ACHN, according to an example embodiment.

FIG. 4 shows operational steps in a detailed specific embodiment for SN operations in an ACHN, according to an example embodiment. The SN in FIG. 4 is shown as RFD 110' and the CN as a PAN coordinator (PC) 120. The RFD 110' sends an association request 411 during which it indicates its capability as a SN to the PC 120. After receiving an ACK 412 from the PC 120 the RFD 110' sends a MAC data request 413. After a MAC ACK 414, the PC 120 transmits an association response which is an AHS frame along with an IE that corresponds to step 201 in method 200 which includes the PC's hopping sequence and the PCs initial timing position within the hopping sequence. The asynchronous Rx channel hopping sequence of the PAN coordinator (based on a standard hopping sequence) is provided to the RFD 110' and the timing information of its position within its hopping sequence through IEs in this AHS frame. The RFD 110' stores the time stamp for the AHS frame and the PC's timing position, then goes to sleep for generally a time corresponding to more than one frame.

Upon wakeup, the RFD 110' sets its frequency band of its Rx channel to a first updated fixed channel of Rx operation shown as F1. The RFD 110' transmits a data request command frame (shown as step 204') to the PC 120 at a channel corresponding to the PC's 120 current Rx channel calculated from the CN's hopping sequence, the time stamp, the CN's initial timing position and a current time (e.g., from its RTC). In response the PC 120 transmits an ACK frame (shown as step 205') at the updated fixed channel of Rx operation of the RFD 110' (here F1) to the RFD 110'. The PC 120 then transmits data (step 206') at F1 to the RFD 110'.

After sending an ACK, the RFD 110' again goes to sleep, and upon wakeup the RFD 110' sets its frequency band of its Rx channel to a second updated (new) fixed channel of Rx operation shown as F2. The RFD 110' transmits a data request command frame (shown as step 204") to the PC 120 at a channel corresponding to the PC's 120 current Rx (listening) channel calculated from the CN's hopping sequence that is stored from before, the time stamp, the CN's initial timing position and a current time (e.g., from the RTC). In response the PC 120 transmits an ACK frame (shown as step 205") at the updated fixed channel of Rx operation of the RFD 110' (here F2) to the RFD 110'. The PC 120 then transmits data (step 206") at F2 to the RFD 110'.

Many modifications and other embodiments will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

What is claimed is:

1. An electronic device comprising:
   a transceiver; and
   a processor configurable to:
   receive, via the transceiver, a first frame from a wireless device;
   determine a reception time stamp of the first frame;
   determine a first timing position of the wireless device within a hopping sequence;
   after receiving the first frame, cause the electronic device to transition to a low power mode;
   after the electronic device transitions to the low power mode, cause the electronic device to transition to an active mode;
   after the electronic device transitions to the active mode, determine a listening channel of the wireless device based on the hopping sequence, the reception time stamp, and the first timing position; and
   transmit, via the transceiver, a second frame in the listening channel.

2. The electronic device of claim 1, wherein the processor is further configurable to:
   receive the first frame via the transceiver in a first channel;
   after the electronic device transitions to the active mode, determine a second channel; and
   receive a third frame from the wireless device, via the transceiver, in the second channel.

3. The electronic device of claim 2, wherein the second frame comprises data indicative of the second channel.

4. The electronic device of claim 2, wherein the third frame is an acknowledgment frame.

5. The electronic device of claim 2, wherein the first and second channels are each within a frequency band between 902 MHz and 928 MHz.

6. The electronic device of claim 2, wherein the second channel and the listening channel are the same channel.

7. The electronic device of claim 2, wherein:
   before the electronic device transitions to the low power mode, the processor is further configurable to receive frames in the first channel; and after the electronic device transitions to the active mode, the processor is further configurable to receive frames in the second channel until a next time in which the electronic device transitions to the low power mode.

8. The electronic device of claim 1, wherein the processor is further configurable to determine the first timing position based on the first frame.

9. The electronic device of claim 1, further comprising a clock configurable to operate while the electronic device is in the low power mode.

10. The electronic device of claim 9, wherein the processor is further configurable to determine the listening channel based on the clock.

11. The electronic device of claim 9, wherein the processor is further configurable to determine the reception time stamp based on the clock.

12. The electronic device of claim 9, wherein the processor is further configurable to cause the electronic device to transition to the active mode before a wraparound time of the clock.

13. The electronic device of claim 12, wherein the wraparound time of the clock is based on 4 bytes of data.

14. The electronic device of claim 1, further comprising a memory, wherein the processor is further configurable to store the first timing position in the memory before the electronic device transitions to the low power mode.

15. The electronic device of claim 1, wherein the hopping sequence is an asynchronous hopping sequence.

16. The electronic device of claim 1, further comprising a sensor or actuator.

17. The electronic device of claim 1, wherein the first frame is a frame according to an IEEE 802.15.4 protocol.

18. The electronic device of claim 1, wherein the second frame comprises a data request command.

19. The electronic device of claim 1, further comprising an antenna coupled to the transceiver, wherein the transceiver is configurable to receive the first frame and transmit the second frame using the antenna.

20. The electronic device of claim 1, wherein the transceiver comprises a receiver, and wherein causing the electronic device to transition to the low power mode comprises causing the receiver to be turned off.

* * * * *